United States Patent [19]

Frejborg

[11] Patent Number: 4,950,402
[45] Date of Patent: * Aug. 21, 1990

[54] ROTATING ELEMENT FOR A SCREENING APPARATUS WITH A CONTOUR SURFACE

[75] Inventor: Frey Frejborg, Glens Falls, N.Y.

[73] Assignee: A. Ahlstrom Corporation, Noormarkku, Finland

[*] Notice: The portion of the term of this patent subsequent to Jun. 30, 2004 has been disclaimed.

[21] Appl. No.: 252,810

[22] Filed: Oct. 3, 1988

Related U.S. Application Data

[63] Continuation-in-part of Ser. No. 41,241, Apr. 22, 1987, Pat. No. 4,776,957, and a continuation-in-part of Ser. No. 61,594, Jun. 11, 1987, Pat. No. 4,880,540, each is a continuation-in-part of Ser. No. 738,743, May 29, 1985, Pat. No. 4,676,903, which is a continuation-in-part of Ser. No. 472,742, Mar. 7, 1983, Pat. No. 4,529,520.

[30] Foreign Application Priority Data

Jan. 26, 1983 [FI] Finland ................................. 830256

[51] Int. Cl.$^5$ .......................... B01D 29/62; B07B 1/20
[52] U.S. Cl. ...................................... 210/413; 209/273
[58] Field of Search .................. 162/55, 380; 209/273, 209/300, 305, 306, 379, 397; 210/413, 415, 498

[56] References Cited

U.S. PATENT DOCUMENTS

| | | | |
|---|---|---|---|
| 3,400,820 | 9/1968 | Nelson | 209/273 |
| 3,726,401 | 4/1973 | Bolton et al. | 209/306 |
| 4,529,520 | 7/1985 | Lampenius | 210/498 |
| 4,676,903 | 6/1987 | Lampenius et al. | 209/273 |
| 4,776,957 | 10/1988 | Lampenius et al. | 209/273 |

*Primary Examiner*—Ivars Cintins
*Attorney, Agent, or Firm*—Bucknam and Archer

[57] ABSTRACT

An apparatus for screening pulp comprises a vessel, a cylindrical screen within the vessel, a rotor moving in the vicinity of the screen at a predetermined speed, an inlet for the unscreened pulp, an outlet for the screened pulp in the vessel. The rotor is non-cylindrical, for instance, elliptical, triangular and, in general, is multi-cam. The rotor has a contour surface, for instance grooves formed of a first bottom plane parallel to the envelope surface, an inclined plane, an upper plane and a side plane, the side plane being essentially perpendicular to the first bottom plane, the inclined plane forming an angle between 5 degrees and 60 degrees with the first plane, the upper plane being parallel to the first plane. The contour surface of the rotor may also be achieved by attaching bars of the contoured shape to the surface of the rotor, for instance by welding.

25 Claims, 13 Drawing Sheets

CONVENTIONAL HYDROFOILS

FIG. 1
(PRIOR ART)

PULSE PROFILE

PULSE PROFILE FROM 1/2 REVOLUTION OF ROTOR IN FIG. 3

FIG. 7a

PULSE PROFILE FROM 1 REVOLUTION OF TRI-LOBE
ROTOR IN FIGURE 5

FIG. 7b

PULSE PROFILE FROM ALTERNATING SURFACE
OF ROTOR IN FIGURE 4

TYP. SHAPE OF BARS

ROTATING ELEMENT FOR A SCREENING APPARATUS WITH A CONTOUR SURFACE

The present application is a Continuation-In-Part of U.S. Ser. No. 041,241 filed Apr. 22, 1987, now U.S. Pat. No. 4,776,957, and Ser. No. 061,594 filed June 11, 1987, now U.S. Pat. No. 4,880,540. U.S. Ser. No. 041,241 and U.S. Ser. No. 061,594 are Continuation-In-Part of U.S. Ser. No. 738,743 filed May 29, 1985, now U.S. Pat. No. 4,676,903 which was a Continuation-In-Part of U.S. Ser. No. 472,742 filed Mar. 7, 1983. The latter has now issued as U.S. Pat. No. 4,529,520 on July 16, 1985. The subject matter of U.S. Ser. Nos. 472,742, 738,743, 041,241 and 061,594 is incorporated herein by reference. U.S. Ser. No. 738,743 has issued as U.S. Pat. No. 4,676,903.

The present invention relates to a screening apparatus which is intended primarily for screening and purification of pulp and more specifically paper pulp. This screening apparatus comprises a vessel, a cylindrical screen in the interior of the vessel, a non-cylindrical rotor which moves in the vicinity of the screen surface, an inlet for the pulp to be screened, an outlet for the reject and another outlet for the screened pulp, which is called the accept.

In U.S. Pat. No. 4,529,520, a cylindrical screen plate is described which has an inlet on one side for introducing the unscreened pulp, and an outlet in the opposite side for removing the reject portion. Means are provided for moving the unscreened pulp along one first direction of flow. The screen plate has grooves in the side of the inlet recessed in the screen surface, the first direction of flow being essentially transverse to the grooves. The grooves are formed of an upstream side plane, a downstream side plane and a bottom plane. The bottom plane is essentially parallel to the envelope surface of the screen plate. The grooves have apertures, holes or slots, in the bottom plane. The upstream side plane of the grooves, as seen standing from the bottom of the grooves, is substantially perpendicular to the envelope surface and the downstream side plane of the grooves forms an angle of 60 degrees–5 degrees against the envelope surface. According to one embodiment, the angle between the downstream side plane of the grooves and the envelope surface of the screen plate is about 30 degrees.

U.S. Pat. No. 4,676,903 defines a rotor intended to increase the intensity of the pulses generated near the openings, either holes or slots within the screen plate, for the purpose of creating the negative pulses necessary to backwash the screen and to prevent plugging. The screen has an inlet side and an outlet side and the rotor is located on the inlet side of the screen. The rotor described in this patent has a contoured surface, with grooves formed of a first plane parallel to the envelope surface, an inclined plane, an upper plane and a side plane, the side plane is essentially perpendicular to the first plane, the inclined plane forming an angle between 30 degrees–60 degrees with the first plane, and the upper plane being parallel to said first plane. Also the screen cylinder has a contoured surface with grooves.

In the paper-making process, pulp is produced by cooking wood which separates the wood into fibers. Due to the different properties of the wood even from the same tree, some of the fibers do not separate and are dispersed as fiber bundles usually called debris, shives or slivers which form the reject. There are also other impurities, such as bark, which must be removed. The screen must separate the undesired impurities and debris called the rejects from the accept portion. In order to avoid substantial losses of fibers which could be carried over together with the debris in the reject portion, it is necessary to remove the impurities efficiently and selectively.

It should be stressed that different applications have different requirements. In some applications, it is necessary to achieve a high content of long fibers, especially secondary fibers, in the accept because the long fibers give strength to the final product, for instance paper. In other applications, on the other hand, the contrary is true. For instance, in virgin or pulp mill fibers, it is desirable to concentrate the long fibers in the reject for reject refining.

A great deal of work has been carried out in connection with screen plates and rotors and it has been recognized that means to create pulsations with the rotor will increase the efficiency of the screening apparatus. U.S. Pat. No. 3,363,759 and U.S. Pat. No. 4,318,805 describe drum rotors with a bumped surface which provides pulsations. In U.S. Pat. No. 4,318,805, the bumps take the form of pins projecting from the rotor with enlarged heads, the heads providing the pulses while the pins offer little resistance to flow.

U.S. Pat. No. 4,447,320 and U.S. Pat. No. 4,200,537 describe rotors which carry blades or vanes moving in the vicinity of the screen which produce a positive pulse. Other patents describe other types of rotors, for instance, U.S. Pat. No. 3,726,401 uses a rotor with bumps or protuberances which produce about equal positive and negative pulses. According to this patent, any form of bumps may be used provided it produces the desired pulses, the bumps and the depressions between them creating positive screening and negative screen cleaning pressure pulses.

U.S. Pat. No. 3,400,820 describes a rotary member made up of a plurality of separate segments joined together and forming a selective undulating pattern which produces about equal positive and negative pulses.

One object of the present invention is to provide a rotor which provides high positive pulses and still maintains high intensity of the pulses, both positive and negative pulses generated near the openings, either holes or slots, within the screen plate, for the purpose of creating the positive pulses to help force the longer fibers through the openings within the screen and the negative pulses which are necessary to backwash the screen and to prevent plugging.

Still another object is to provide a rotor which may be used in an apparatus in which the screen has an inlet side and outlet side and the rotor is located on the inlet side of the screen but the contour surface of the screen may be the outer or the inner surface of the screen cylinder.

Another object is to provide a rotor which produces sharp and steep pulses, thus resulting in high intensity.

Another object is to provide a rotor which permits to operate with smaller apertures in the screen cylinder thus improving the screening efficiency.

Still another object is to provide a rotor which may be used in conjunction with the screen plate described and claimed in U.S. Pat. No. 4,529,520, but is not limited to the screen plate of this patent.

Specifically, an object of the present invention is to provide a rotor which generates a combination of positive and negative pulses, both high frequency and low magnitude pulses and low frequency and high magnitude pulses.

It has now been found that both the specific contour of the rotor surface and the non-cylindrical shape of the rotor as described hereinbelow are particularly advantageous in producing a combination of higher intensity pulses and sufficient negative pulses so that plugging of the screen is minimized, due both to the contour shape of the surface of the rotor and the fact that the rotor is non-cylindrical or cam-shaped.

The non-cylindrical shape of the rotor combined with the contoured surface of the rotor surprisingly permits to achieve high frequency and low amplitude pulses and also low frequency and high amplitude pulses. This combination also permits to achieve such a turbulence that the pulp remains in a fluidized state, while passing through the smaller apertures of the screen.

The present invention will be illustrated in more detail by reference to the accompanying drawings of which.

Figure 1:
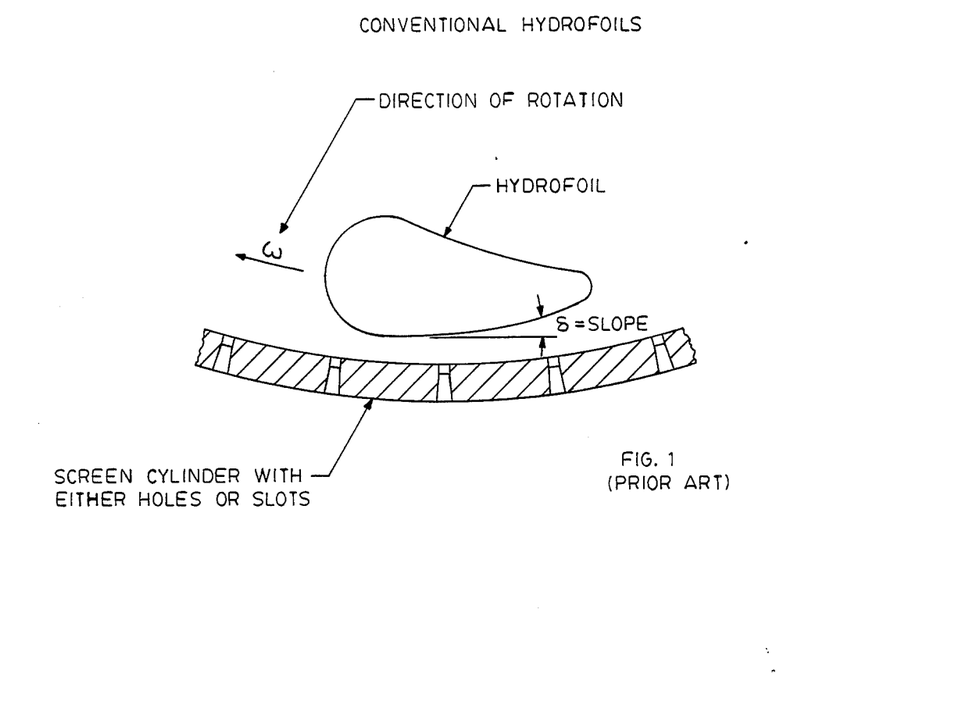
FIG. 1 illustrates a conventional pressure screen using hydrofoils for producing pulses.
Figure 2:
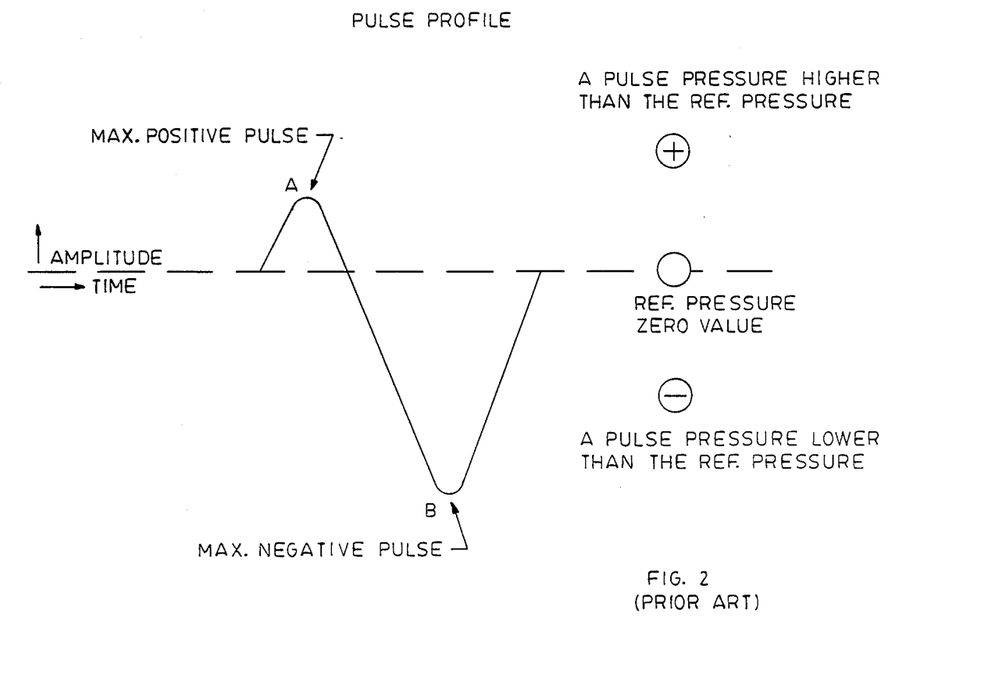
FIG. 2 illustrates the pulses which are produced by the rotating hydrofoil screens of FIG. 1.

The lobe-shaped surfaces or protrusions of rotors known in the art, e.g. in U.S. Pat. No. 3,726,401, have leading surfaces curved towards the screen cylinder until the minimum rotor clearance point is reached, followed by a trailing surface curving away from the screen. At the minimum rotor clearance point, the change in slope of the curved surface is 0. Shortly after this point, the magnitude of the negative pulses starts to increase to a maximum negative value after which the pulses start decreasing again, thus repeating the cycle, as shown in FIG. 2.

One feature the present invention resides in providing a non-cylindrical rotor and with grooves, the grooves having a contour surface being formed of a first bottom plane parallel to the envelope surface, an inclined plane which is the upstream side plane, an upper plane and a side plane, which is the downstream side plane, the side plane being substantially perpendicular to the first plane and the inclined plane of the grooves forming a 5 degree-60 degree angle against the first plane, the upper plane being parallel to the first plane. According to a preferred embodiment this angle is about 15 degrees.

According to one embodiment, the direction of the grooves or bars may be different from the axial direction.

Figure 3:
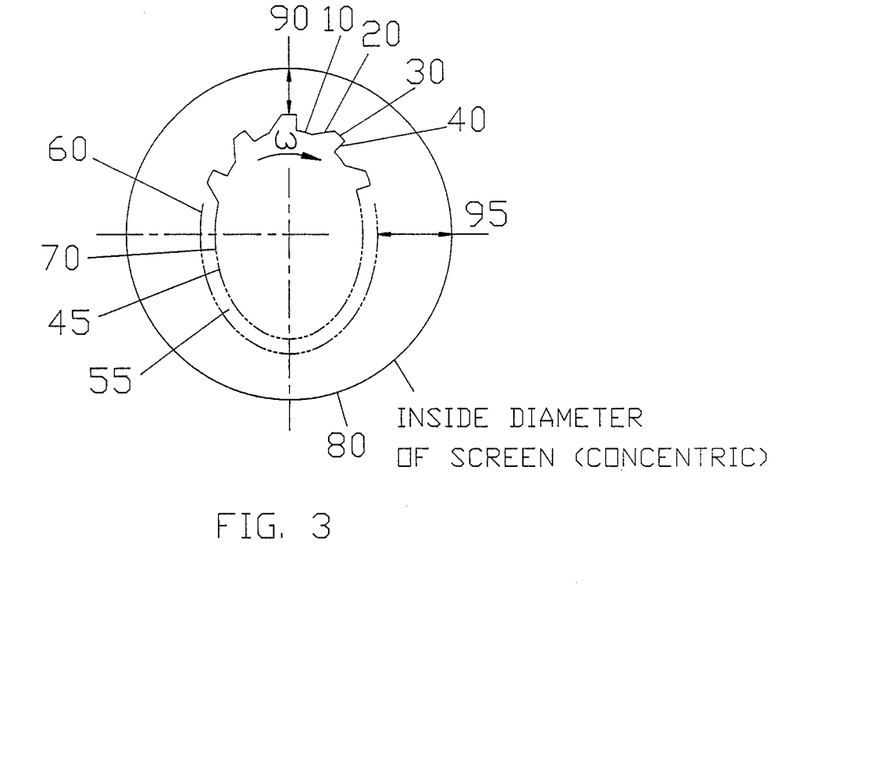
FIGS. 3 and 3a illustrate the contour surface of one embodiment of the rotor in accordance with the present invention which produces pumping and high frequency.
Figure 3A:
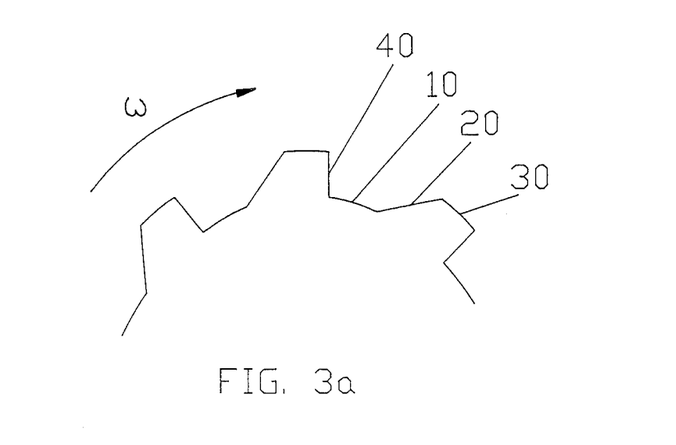

By reference to FIGS. 3, 3a; 4, 4a; 5, 5a; 6, 6a, numeral 10 designates the first bottom plane and numeral 20 designates the inclined plane. Numeral 30 designates the upper plane and numeral 40 designates the side plane perpendicular to the first plane. The leading contoured surface has a first plane 10 parallel to the envelope surface. It then intersects side plane 40 forming essentially a right angle which produces the high intensity positive pulses which help force the long type fibers and liquid through the screen. The side plane continues until it intersects the upper plane 30 again forming essentially another right angle Upper plane 30 continues parallel to the envelope surface, then slopes forming an inclined plane 20 until it reaches the bottom plane.

FIG. 3 illustrates a rotor with an elliptical shape. As shown in the figure, the rotor has a contour surface with the leading surface side plane 40 which produces high intensity positive pulses. A negative pulse is produced as the fluid flows over the upper plane surface 30 and the diverging inclined plane 20. Therefore, the pulses produced by the contour surfaces are positive pulses followed by a negative pulse. The frequency of these pulses for a typical rotor may be in the range of 200 to 600 Hz.

As shown in FIG. 3 the upper plane 30 is essentially parallel to the first plane 10, both forming an elliptical shape paths 60 and 70 respectively. The clearance between rotor 45 and the concentric screen cylinder 80 will vary from a minimum clearance 90 along the major axis of the ellipse to the max. clearance point 95 along the minor axis. Therefore, as the rotor moves, stock within the screening zone 55 is pumped from the max. clearance point 95 to the min. clearance 90 and this pumping action forces the stock through the screen cylinder while reducing the overall pressure drop across the screen itself.

As the elliptical shaped rotor 45 moves, a positive pulse is produced in front of the minimum clearance point 90 and a negative pulse just in front of the maximum clearance point 95 is produced due to the contour surface as shown in FIG. 7. As shown, with an elliptical shape rotor there will be two large positive and negative pulses per revolution due to the pumping action of the rotor. The frequency of these large pulses will be in the order of 40 to 100 Hz.

Figure 4:
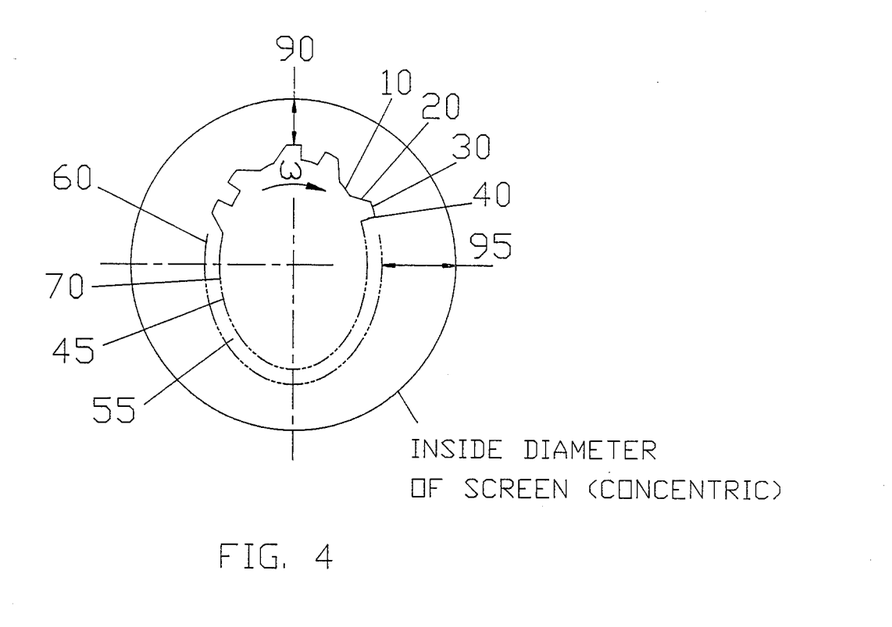
FIG. 4 and 4a illustrate another embodiment of the rotor according to the present invention.
Figure 4A:
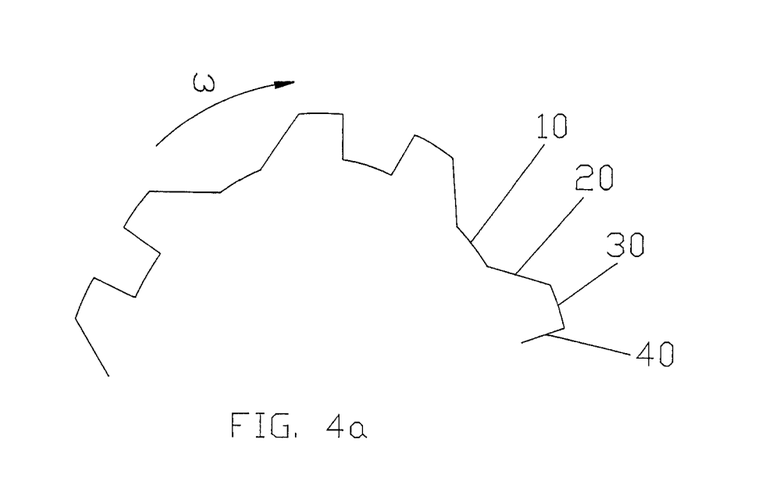

FIGS. 4 and 4a show another contour surface configuration which may have some advantages in higher efficient screening applications. As shown the leading surface of the contour surface is alternating between side plane 40 and the inclined plane 20. With side plane 40 as the leading surface, a high intensity positive pulse is produced followed by a lower intensity negative pulse due to the inclined surface. A very high intensity positive pulse would tend to force both the fibers and contaminants through the apertures within the screen. With the inclined plane 20 as the leading surface, a lower intensity and lower magnitude positive pulse is produced followed by a higher intensity negative pulse due to the sharp diverging change in direction of the stock flowing over the side plane surface 40. This higher intensity negative pulse helps the backflushing of the apertures within the screen, keeping it from plugging. The lower intensity positive pulse also forces less contamination through the screen thus achieving higher screening efficiencies. Therefore, this alternating contour surface rotor gives both good capacity and efficiency.

Figure 5:
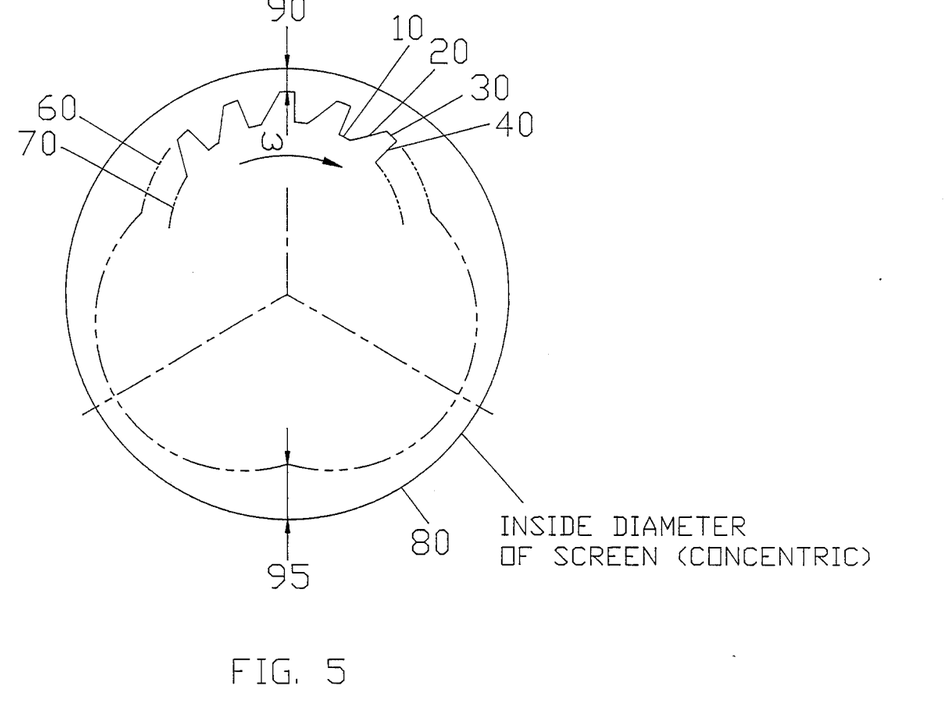
FIGS. 5 and 5a illustrate another embodiment of the rotor according to the present invention.
Figure 5A:
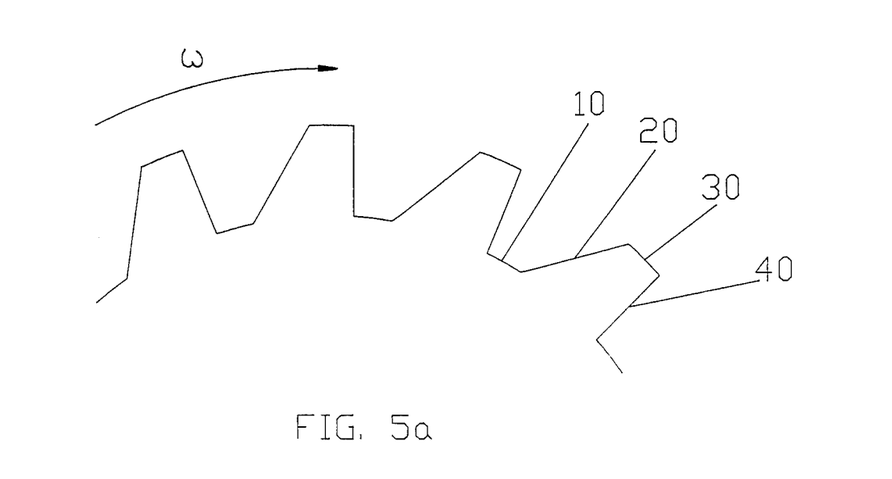

FIG. 5 shows a trilobed rotor with a contour surface. The advantage of this rotor over an elliptical rotor is that the positive and negative pulses are 120 degrees apart instead of 180 degrees with an elliptical rotor. The reason is that the pulses 180 degrees apart might cause the screen cylinder to assume an egg shape and put a very high load on the screen cylinder which might cause it to fail. The trilobed rotor also gives more pumping action than the elliptical rotor, due to the increase of pulse frequency.

With reference to the rotors illustrated in FIGS. 3, 4 and 5, the clearance varies between ⅛" and 1.5 inch.

Figure 6:
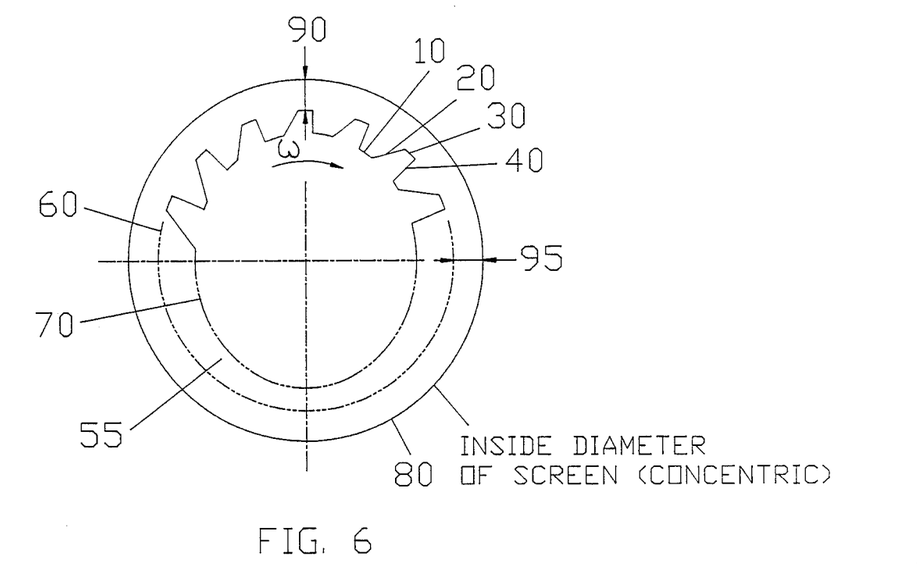
FIGS. 6 and 6a illustrate still another embodiment according to the present invention.
Figure 6A:
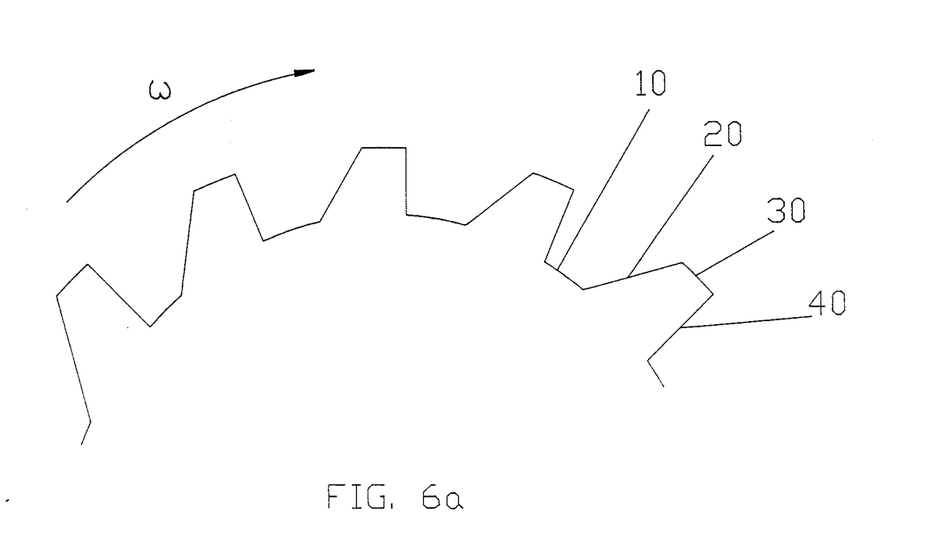
Figure 7A:
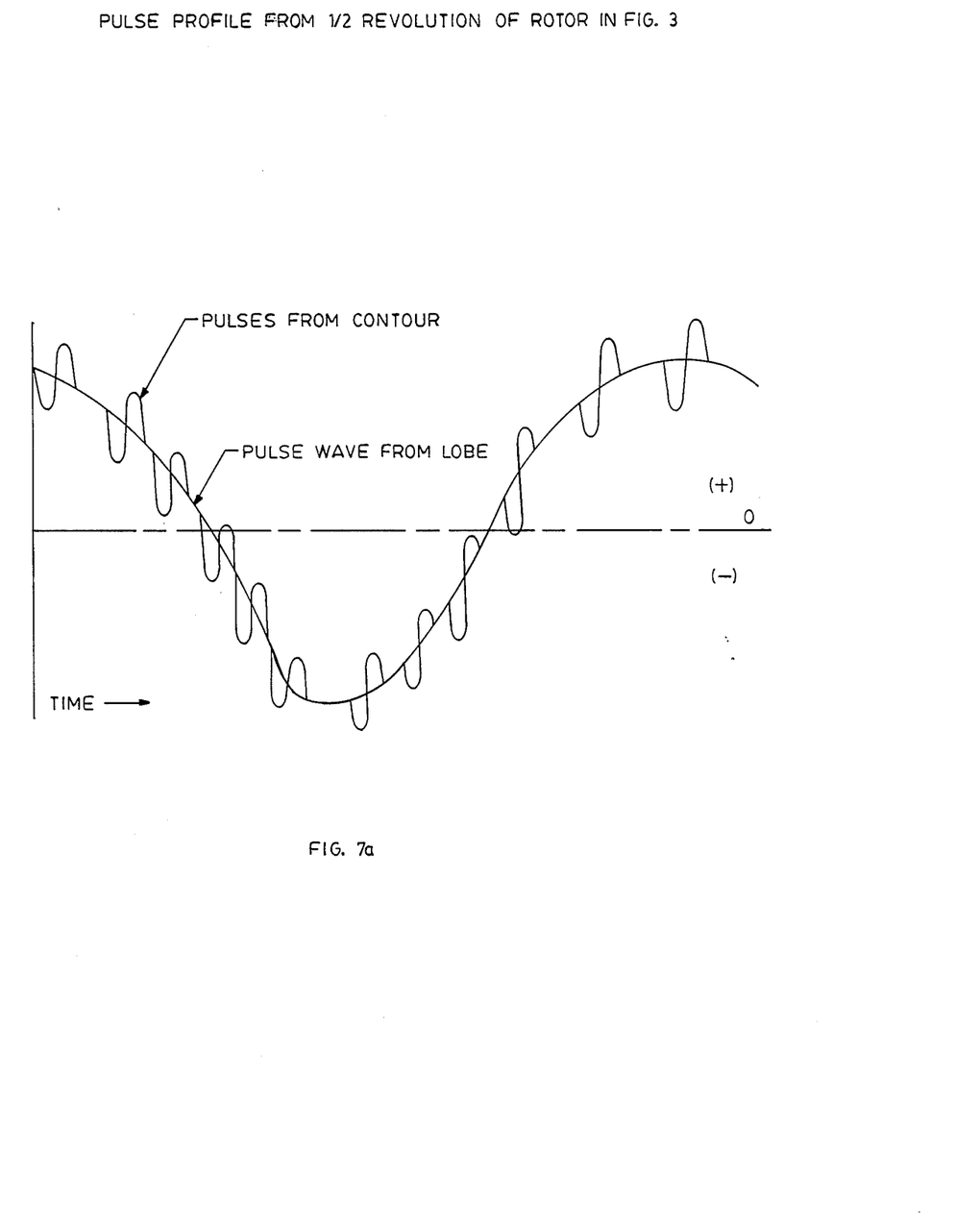
FIG. 7a shows the general shape of the pulse obtained with a rotor according to FIG. 3.
Figure 7B:
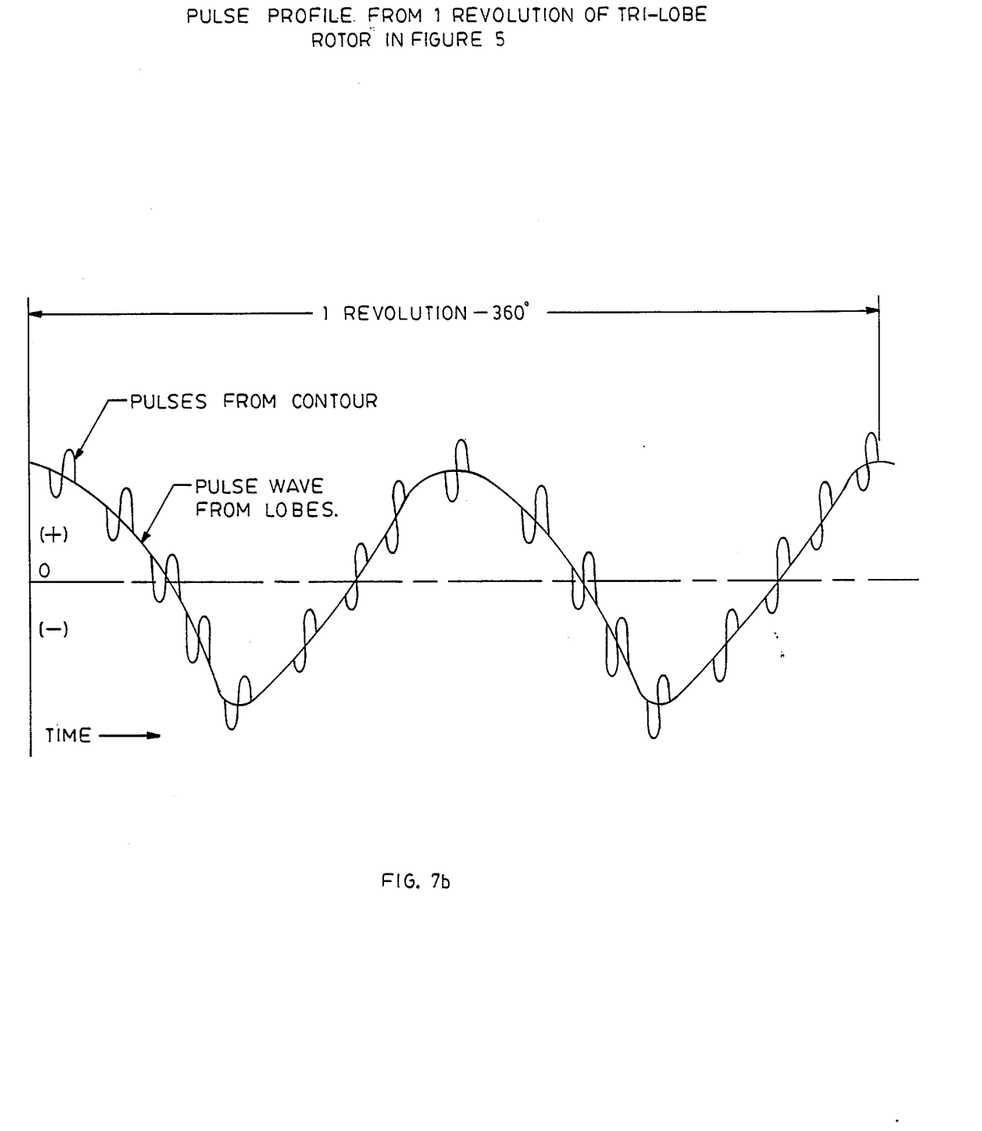
FIG. 7b shows the pulse from the rotor according to FIG. 5.
Figure 7C:
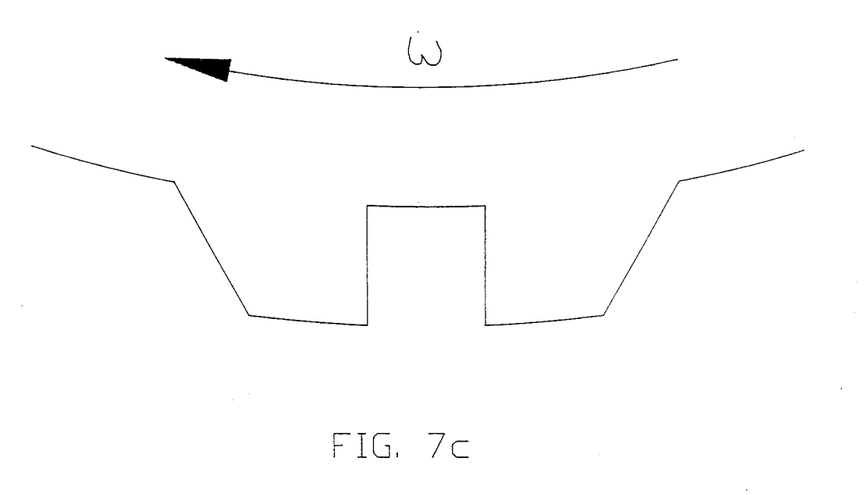
FIGS. 7c and 7d illustrate the pulse with a rotor according to FIG. 4.
Figure 7D:
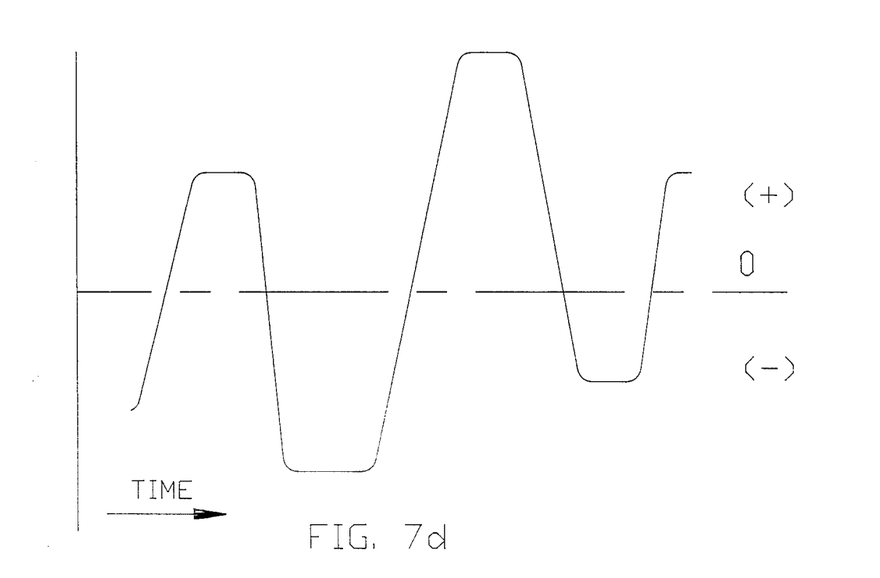
Figure 8A:
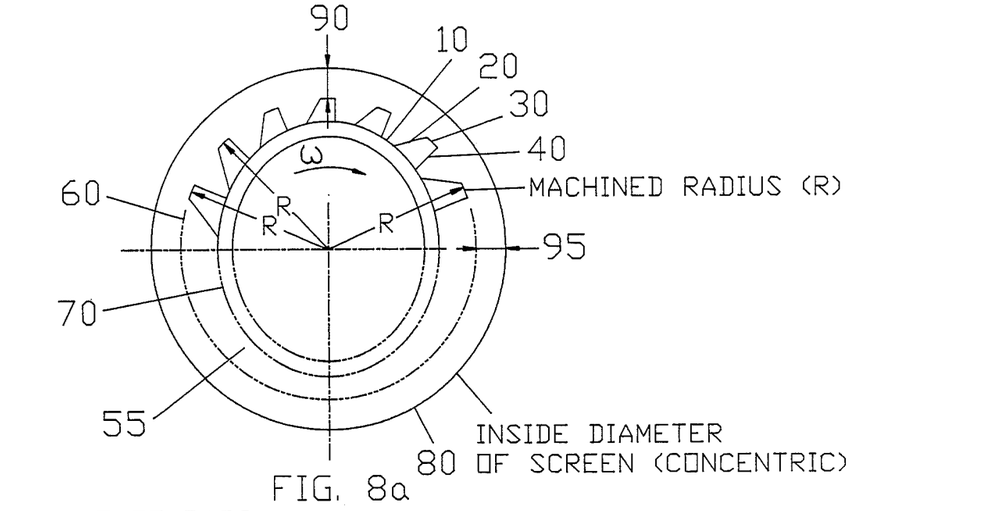
FIGS. 8a and 8b show the contoured surface of the rotor but with bars instead of grooves.
Figures 8B, 8C:
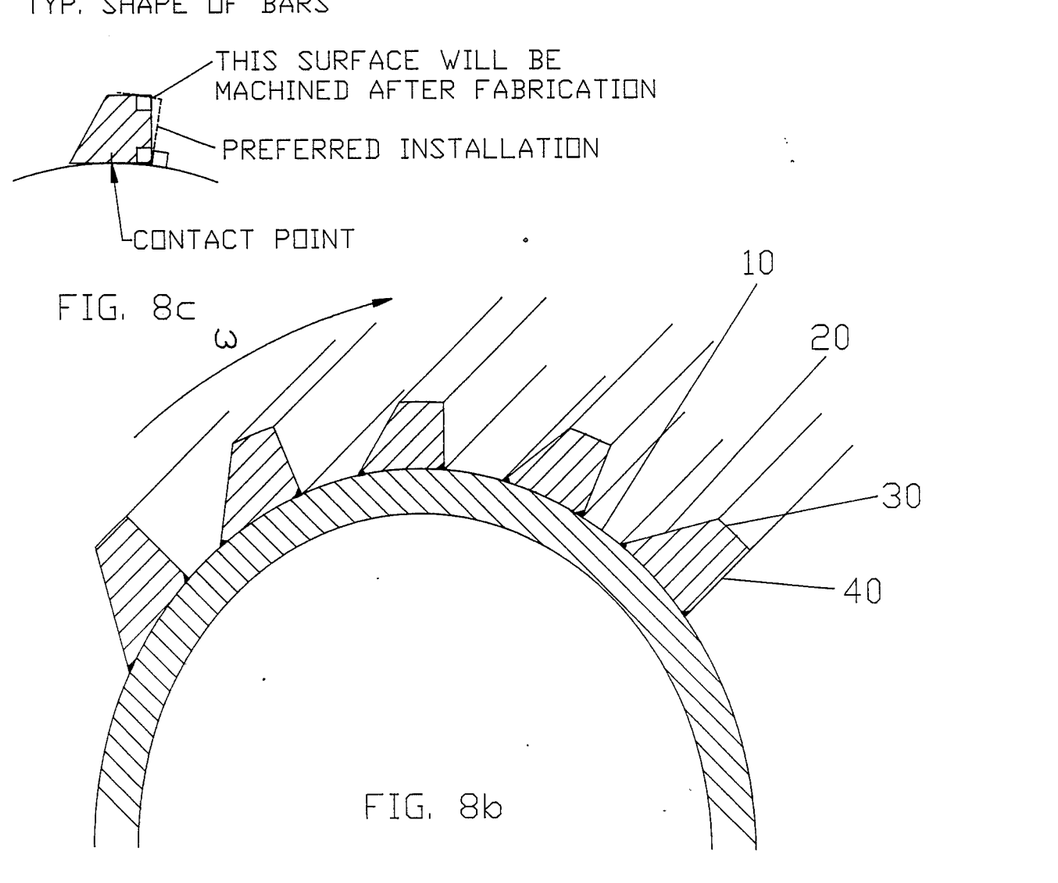
FIG. 8c shows a typical shape of the bar.

FIGS. 6 and 6a show a unique pumping rotor where the clearance 90 with the screen cylinder 80 is constant. As shown, the path 60 of the upper plane of the contour surface is now circular versus the elliptical path 70 of the first plane. The constant clearance is obtained by changing the size or depth of the side plane 40 for each contour protrusion. The pumping action of the rotor is due to the decrease in void volume in the screening zone 55 between the rotor base 70 and the internal diameter of the screen 80.

The advantage of the rotor shown in FIG. 6 is that a constant clearance is maintained between the upper plane 30 and the internal diameter of the screen 80 thus ensuring that a maximum circumferential stock velocity is achieved in the screening zone to produce maximum intensity and magnitude pulses induced by the flow over the contoured surface of the screen cylinder.

The upper plane 30 varies between ⅛" and 2", preferably ⅜". The perpendicular side plane 40 varies between ⅛" and 2", preferably ¼". The rate of revolution of the rotor varies between 400 RPM and 2200 RPM. The profile pitch of the rotor varies between ⅛" and 6".

Cam shaped rotors with contour surfaces are ideal to use with all screen cylinders which have contoured surfaces, on the inlet side of the screen cylinder. The reason is that all these designed contoured or bar screen cylinders depend upon maintaining high circumferential stock velocities at the surface of the screen cylinder to produce the self-induce of pulses which help keep the apertures within the screen from plugging and which also fluidize the fiber suspension making it easier to flow through the apertures.

The screen cylinder has apertures at the bottom of the grooves or in the space between two profile bars, and the apertures may be positioned on a plurality of rows within each groove or in the space between two profile bars.

Figure 9:
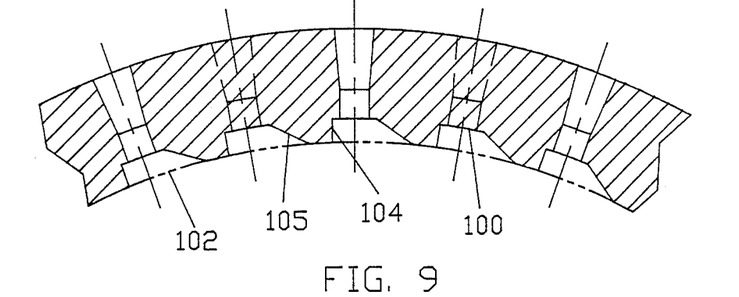
FIGS. 9-15 illustrate different embodiments of the contoured surface of the screen plate which may be used with the rotor according to the present invention.
Figure 10:
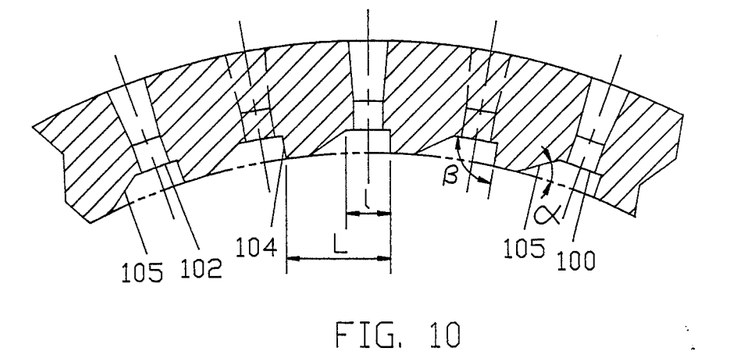

In the embodiments of FIGS. 9 and 10, the groove in the screen is formed of a bottom plane 100 which is substantially parallel with the envelope surface 102 of the screen surface, an upstream side plane 104 as seen standing from the bottom of the groove and a downstream side plane 105.

In FIG. 9, the angle α between the envelope surface of the screen surface and the upstream side plane 104, or in other words, between the plane tangenting the envelope surface of the screen surface close to this side plane and this side plane is approximately 90° and the angle β between the envelope surface of the screen surface and the downstream side plane 105 is 5°-60°. In FIG. 10 the angle α is 5°-60°, and the angle β is 90°. The perforations of the screen plate are disposed on the bottom planes 100 of the grooves.

Figure 11:
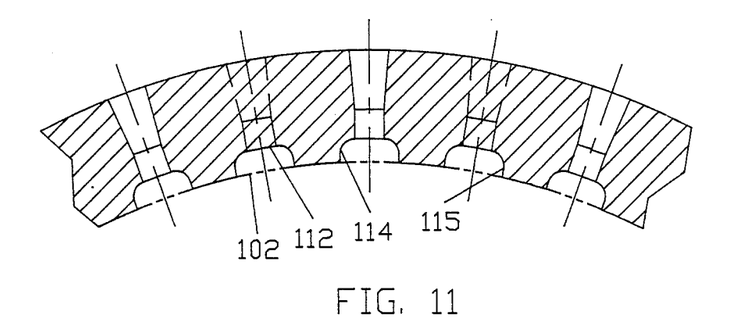

In the embodiment illustrated in FIG. 11, the grooves are U-shaped and both side planes 114 and 115 are substantially perpendicular to the envelope surface 102 of the screen surface.

Figure 12:
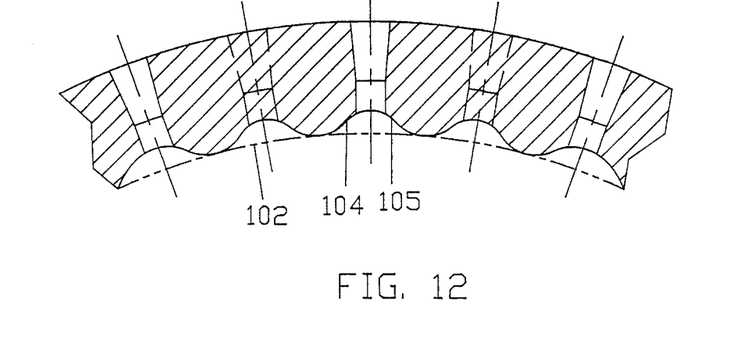

In the embodiment of FIG. 12, the screen surface is undulant, and both sides 114 and 115 of the grooves 112 are inclined with regard to the envelope surface 102 of the screen surface.

Figure 13:
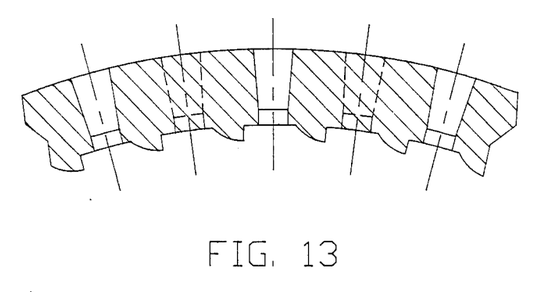
Figure 14:
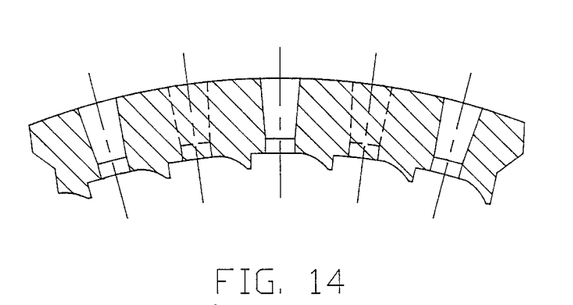
Figure 15:
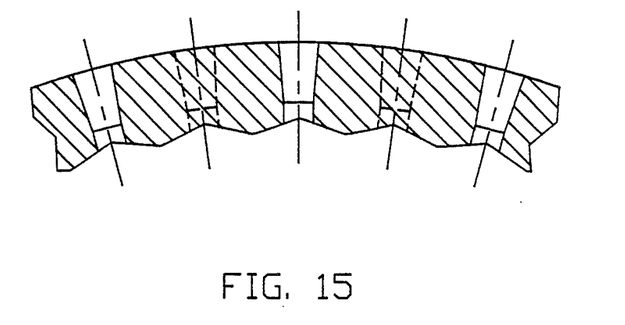
Figure 16:
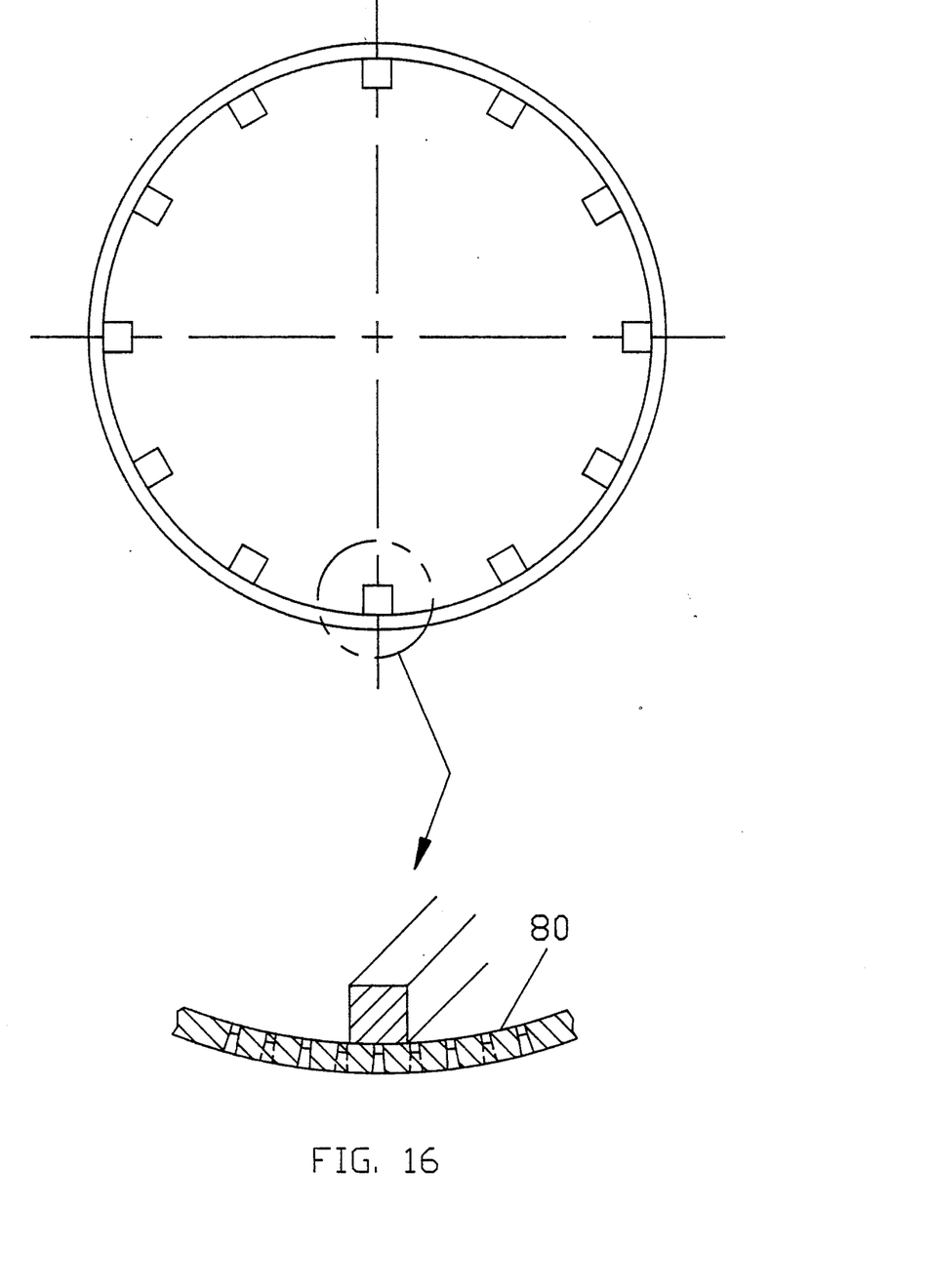
FIG. 16 shows the contoured surface of a screen plate which has bars instead of grooves.

In the embodiments of FIGS. 13 and 14, the grooves have two side planes, a bottom plane and an upper plane, one side plane is perpendicular to the envelope surface of the screen cylinder, and the other side plane is curved, convex or concave with respect to the envelope surface. In the embodiment of FIG. 15, the sides of the grooves have an inverted V-shape configuration.

The apparatus is operated with the rotor disposed in the inlet side of the screen, but is intended both for outflow operation or inflow operation.

What is claimed is:

1. In an apparatus for screening pulp which comprises a vessel, a screen cylinder having an envelope surface within the vessel, a rotor moving in the vicinity of the screen at a predetermined speed, an inlet for the unscreened pulp, a first outlet for the accept screened pulp in said vessel, and a second outlet for the reject, said first and second outlets being in operative communication with said screen, the improvement which comprises said rotor having a non-cylindrical shape and having a contour surface formed of a first bottom plane essentially parallel to the envelope surface, an upstream inclined plane, an upper plane and a downstream side plane, said side plane being essentially perpendicular to said first bottom plane, said inclined plane forming an angle between 5 and 60 degrees with said first plane, said upper plane being essentially parallel to said first plane whereby a lower frequency-pumping action and high frequency-high intensity positive pulses are generated with improved screening and capacity at a pulp concentration up to 6%.

2. The apparatus according to claim 1 wherein clearance is formed between said rotor and said screen and said clearance varies between a maximum and a minimum value.

3. The apparatus according to claim 2 wherein said rotor has an elliptical shape.

4. The apparatus according to claim 2 wherein the clearance varies between ⅛" and 1.5".

5. The apparatus according to claim 1 wherein said rotor has a leading surface and said leading surface alternates between said side plane which is perpendicular to the bottom plane and said inclined plane.

6. The apparatus according to claim 1 wherein said rotor is trilobe.

7. The apparatus according to claim 1 wherein said contoured surface of the rotor is formed with grooves.

8. The apparatus according to claim 7 wherein said grooves on the surface of said rotor vary in depth and the clearance between the surface of the rotor and the screen is constant.

9. The apparatus according to claim 1 wherein said contoured surface of the rotor is formed with bars.

10. The apparatus according to claim 1, wherein said screen cylinder has an inlet side and an outlet side, said inlet side having a contoured surface produced with grooves or bars.

11. The apparatus according to claim 10 wherein said rotor is located on the inlet side of the screen cylinder.

12. The apparatus according to claim 11, wherein said rotor has an inner surface, said inner surface is contoured, and the screen cylinder has an outer contoured surface, and said inner surface of the rotor faces said outer contoured surface of the screen cylinder.

13. The apparatus according to claim 10 wherein said envelope surface has grooves with apertures, the apertures are at the bottom of the grooves, the bottom plane of the grooves is essentially parallel to the envelope surface, the grooves have two side planes, one side plane of the grooves is substantially perpendicular to the envelope surface of the screen surface and the other side plane is inclined with regard to said envelope surface.

14. The apparatus according to claim 10 wherein said inlet is recessed in the screen surface and said screen cylinder has grooves in the side of the inlet recessed in the screen surface, the grooves being formed of an upstream side plane, as seen standing from the bottom of the grooves, a downstream side plane and a bottom plane, said bottom plane being substantially parallel to the envelope surface of the screen cylinder, the grooves having apertures in the bottom plane, the upstream side plane of the grooves being substantially perpendicular to said envelope surface and the downstream side place of the grooves forming a 60°-5° angle against said envelope surface.

15. The apparatus according to claim 10 wherein said contoured surface of said screen cylinder is formed by grooves, the downstream side plane and the upstream side plane of the grooves are connected to each other.

16. The apparatus according to claim 10 wherein said contoured surface of said screen cylinder is formed by the grooves, the downstream side plane of the grooves is substantially perpendicular to the envelope surface of the screen surface and the upstream side plane is inclined. and the upstream side plane is inclined.

17. The apparatus according to claim 10 wherein the contoured surface of the screen cylinder consists of grooves and both side planes of the grooves are substantially perpendicular to the envelope surface of the screen.

18. The apparatus according to claim 10 wherein the screen cylinder has grooves having apertures, the apertures are at the bottom of the grooves, the bottom plane of the grooves is parallel to the envelope surface, the grooves have two side planes and an upper plane, one side plane of the grooves is substantially perpendicular to the envelope surface of the screen cylinder and the other side plane is curved with regard to said envelope surface.

19. The apparatus according to claim 18 wherein said side plane is convex or concave with respect to said envelope surface.

20. The apparatus according to claim 10 wherein the said envelope surface is undulant, the screen cylinder has grooves and both sides of the grooves are inclined with respect to the envelope surface.

21. The apparatus according to claim 10 wherein said contoured surface is formed by grooves and said grooves have an inverted V configuration.

22. The apparatus according to claim 10 wherein said contoured surface of the screen cylinder is formed by grooves, the grooves have an upstream side plane and a downstream side plane, both said upstream side plane and said downstream side plane are inclined thereto and are connected to each other by means of a plane substantially parallel to said envelope surface.

23. The apparatus according to claim 10 wherein said contoured surface of the screen cylinder is formed by grooves and a plurality of rows of apertures is provided at the bottom of each groove.

24. The apparatus according to claim 1 wherein the screen cylinder has a contoured surface and said contoured surface of the screen is on the inside of the screen cylinder.

25. In an apparatus for screening pulp which comprises a vessel, a screen cylinder having an envelope surface within the vessel, a rotor moving in the vicinity of the screen at a predetermined speed, an inlet for the unscreened pulp, a first outlet for the accept screened pulp in said vessel, and a second outlet for the reject, said first and second outlets being in operative communication with said screen, the improvement which comprises said rotor having a non-cylindrical shape and having a contour surface formed of a first bottom plane essentially parallel to the envelope surface, an upstream inclined plane, an upper plane and a downstream side plane, said side plane being essentially perpendicular to said first bottom plane, said inclined plane forming an angle between 5 and 60 degrees with said first plane, said upper plane being essentially parallel to said first plane, wherein said screen cylinder has a contoured surface on the inlet side produced with grooves or bars, said rotor is located on the inlet side of the screen cylinder whereby a lower frequency-pumping action and high frequency-high intensity positive pulses are generated with improved screening and capacity at a pump concentration up to 6%.

* * * * *